US010380139B2

(12) United States Patent
Adamut (10) Patent No.: US 10,380,139 B2
(45) Date of Patent: Aug. 13, 2019

(54) SQL INTERCEPTOR FOR USE WITH THIRD PARTY DATA ANALYTICS PACKAGES

(71) Applicant: Spirent Communications, Inc., Sunnyvale, CA (US)

(72) Inventor: Marius Adamut, Hazlet, NJ (US)

(73) Assignee: Spirent Communications, Inc., Sunnyvale, CA (US)

( * ) Notice: Subject to any disclaimer, the term of this patent is extended or adjusted under 35 U.S.C. 154(b) by 247 days.

(21) Appl. No.: 15/352,550

(22) Filed: Nov. 15, 2016

(65) Prior Publication Data

US 2018/0137184 A1    May 17, 2018

(51) Int. Cl.
*G06F 17/30*    (2006.01)
*G06F 16/25*    (2019.01)
*H04L 29/08*    (2006.01)
*H04L 29/06*    (2006.01)
*G06F 16/2455*    (2019.01)

(52) U.S. Cl.
CPC .......... *G06F 16/258* (2019.01); *G06F 16/252* (2019.01); *H04L 67/02* (2013.01); *H04L 67/42* (2013.01); *G06F 16/2455* (2019.01)

(58) Field of Classification Search
CPC ...................................................... G06F 17/30
See application file for complete search history.

(56) References Cited

U.S. PATENT DOCUMENTS

| 2005/0278276 | A1* | 12/2005 | Andreev | ........... G06F 17/30483 |
| 2012/0166483 | A1* | 6/2012 | Choudhary | ....... G06F 17/30545 |
| | | | | 707/770 |
| 2016/0072927 | A1* | 3/2016 | Xue | ........................ H04L 69/08 |
| | | | | 709/203 |
| 2017/0116335 | A1* | 4/2017 | Baby | ........................ G06F 8/65 |

OTHER PUBLICATIONS

Muse, D., "SQL Relay," Copyright 2014, Retrieved online: http://sqlrelay.sourceforge.net/documentation.html, accessed on Aug. 8, 2016, 1 page.

* cited by examiner

*Primary Examiner* — Khanh B Pham
(74) *Attorney, Agent, or Firm* — Haynes Beffel & Wolfeld; Ernest J. Beffel, Jr.; Andrew L. Dunlap (57) ABSTRACT

An SQL interceptor inserted as a proxy between a database client and the corresponding database server intercepts a constrained application-generated SQL query and composes a new data request. Parameter values in the SQL query determine whether the new data request is sent to a database server or a web service provider. A reserved table name specified in the SQL query triggers a rewrite of the data request. Parameter values in the query are used to select among a plurality of executable modules to use for rewriting the data request. Special data encoding and formats need to be used based on the source of data that will receive and respond to the rewritten data request. For example, communication between a database client and server may use a vendor-specific, non-standard binary encoding, and XML and JSON response data must be reformatted as an SQL response for processing by the database client.

10 Claims, 12 Drawing Sheets

```
SELECT
    *
FROM
    (
        SELECT
            *
        FROM      sql_tmpl_tbl     ← 720
        WHERE
            p_sql_tmpl =           ← 730
                     'sql/tableau/adoption/cont_subgrp_usqi'   ← 740
            AND p_trend_period = 7
            AND p_report_type = 'trending'
            AND p_summary_type = 'last_hour'     ← 710
            AND p_market = 'All'
            AND p_subscriber_group = 'All Subscribers'
    ) "Custom_SQL_Query"
;
```

```
$rt.setTool("summary",$p_summary_type)

with content_types as (
    select
        content_type_key
    from
810 ───► agg_$rt.getAggType()_cont_subgrp_usqi_f f
        join date_dim dt using (date_key)
        join version_dim v using (version_key)
    where
        $rt.getDateFlt()
        and f.subscriber_group_key =
$rt.getSubGrpKey($p_subscriber_group)              ◄─── 820
        and f.region_key = $rt.getRegKey($p_market)
    order by us_qoe_impacted desc
    limit 3
)
$rt.setTool($p_report_type,$p_summary_type)
select
        dt.local_timestamp,
        dt.local_hour,
        c.name as content_type,
        us_overall,
        us_qoe_impacted,
        revenue_subs_qoe_impacted
from
        agg_$rt.getAggType()_cont_subgrp_usqi_f f
        inner join content_types
                        using (content_type_key)
        inner join date_dim dt using (date_key)
        inner join version_dim using (version_key)
        inner join content_type_dim c using (content_type_key)
        inner join subscriber_group_dim s using
(subscriber_group_key)
        inner join region_dim r using (region_key)
where
        $rt.getDateFlt()
        and f.subscriber_group_key =
$rt.getSubGrpKey($p_subscriber_group)
        and f.region_key = $rt.getRegKey($p_market)
```

```
SELECT * FROM (with content_types as (
    select
        content_type_key          910
    from
        agg_h_cont_subgrp_usqi_f f
        join date_dim dt using (date_key)
        join version_dim v using (version_key)    920
    where
        f.date_key >= 2016080602000000 and f.date_key <
2016080603000000
        and f.subscriber_group_key = -3
        and f.region_key = -2
    order by us_qoe_impacted desc
    limit 3)
select
        dt.local_timestamp,
        dt.local_hour,
        c.name as content_type,
        us_overall,
        us_qoe_impacted,
        revenue_subs_qoe_impacted
from
        agg_h_cont_subgrp_usqi_f f
        inner join content_types
                        using (content_type_key)
        inner join date_dim dt using (date_key)
        inner join version_dim using (version_key)
        inner join content_type_dim c using
(content_type_key)
        inner join subscriber_group_dim s using
(subscriber_group_key)
        inner join region_dim r using (region_key)
where
        dt.local_timestamp >= TO_DATE('2016/8/5',
'YYYY/MM/DD') - 7 + 1 and dt.local_timestamp <
TO_DATE('2016/8/5','YYYY/MM/DD') + 1 and f.date_key
 >= 2016073004000000 and f.date_key < 2016080611000000
        and f.subscriber_group_key = -3
        and f.region_key = -2) "Custom_SQL_Query"
```

FIG. 9

```
SELECT
    *
FROM
    (
        SELECT
            *
        FROM    → sql_anova_tbl
        WHERE
               → p_anova_api = 'network_qoe'
            AND p_imsi = '334050020278963' ←——1030
            AND p_trend_period = 7
            AND p_display_type = 'last_hour'
            AND p_workbook =
    'SubscriberExecutiveDashboard'
    ) "custom_sql_query"
```

1010 points to `sql_anova_tbl`
1020 points to `p_anova_api = 'network_qoe'`

SQL INTERCEPTOR FOR USE WITH THIRD PARTY DATA ANALYTICS PACKAGES

BACKGROUND OF THE INVENTION

A mobile communications network is defined as any communications network that has over-the-air data/voice transmissions between a mobile client device (i.e. a handset, computer, mobile router, etc.) and a network base station (i.e. Access point, cell site, etc.). Common commercial examples include Wi-Fi networks, and 2G, 3G, 4G (LTE) and upcoming 5G cellular networks. In such networks the endpoint of the network, the network base station, acts as the entry point into the network. It converts the over-the-air communications with the mobile client device into wired communications back into the network using technologies such as Ethernet and IP.

This application relates to enhancing report writing capabilities in off-the-shelf business intelligence (BI) applications. A problem with some off-the-shelf BI applications is that the data visualizations that can be rendered are constrained to data that can retrieved in a query specified in SQL. It is impossible for a BI tool to display data from a system that is accessible through an interface other than SQL (e.g. Web Services). Some data systems even though they support SQL don't support a procedural language as an extension to SQL, making impossible to combine SQL with custom procedures or functions. At least partially because SQL does not support an if/then/else structure, either the user would have to write and maintain many separate queries that are very similar, or to package a single query to handle all similar variations would be cumbersome and potentially error prone. Packaging a single SQL query would need to be expressed as multiple subqueries with a "union all" operator to combine results retrieved from each of the subqueries. Each of the subqueries would retrieve data conditionally depending on the WHERE clause. Only one of the subqueries may have its WHERE clause condition satisfied based on a combination of parameter values; thus, only one of the subqueries would may retrieve data. Processing the other subqueries that would not retrieve results may negatively impact performance and potentially confuse the database query optimizer. For example, when similar reports are needed that use different tables having a similar structure, a distinct subquery is needed for each data table that holds similar data. That is, each of the subqueries would have a SELECT clause with a different table name. Another example is writing a query that selects data that is relative to current time (e.g. last processed interval) versus a specific interval. Each subquery may include a condition indicating the constraints placed on timestamps of the data being retrieved. Writing a query in this way would likely be prone to coding errors and may adversely affect the performance of the query. In other words, lack of support for templates causes users to create many similar but slightly different SQL queries. It would be desirable to allow a user to continue using off-the-shelf applications but providing more flexibility to specify the desired data without having to duplicate effort.

A business intelligence application such as Tableau accesses the database using the Open Database Connectivity (ODBC) interface. ODBC is a standard application programming interface (API) for accessing database management systems (DBMS). The application uses ODBC functions through an ODBC driver with which it is linked. The ODBC driver that is used is specific to particular vendor's database server, and often the database vendor provides the ODBC driver. The driver passes the query to the database management system (DBMS), handling DBMS-specific protocols and formats, and using DBMS-specific functionality. For example, Tableau may retrieve data from a Vertica database using an ODBC driver for Vertica.

BRIEF SUMMARY OF THE INVENTION

A Structured Query Language (SQL) interceptor is introduced that is inserted as a proxy between a database client and the corresponding database server to intercept an encoded SQL query from the database client, decode the SQL query to determine which module creates the data request, to which data source the data request will be directed, and the parameters to be used by the module to construct the data request to the data source. The format of the data request and the way the request is created may differ depending on the data source. The original SQL query is typed in by a user through an interface in a business intelligence tool and is written in a special way to encode the module, data source, and the parameter names and values. If the table name specified in the query matches a reserved table name, then a particular module is invoked. One such module can be used to generate a Web Service request, another module can be used to generate a new SQL query to run against the database. Yet another module can be used to invoke a specific function within the interceptor. The executable module uses the extracted parameter values to create a new data request. If the table name specified in the original query matches the reserved table name for requesting an SQL query, then the interceptor invokes a module that creates another SQL query that is binary-encoded before being sent to the database server instead of the intercepted encoded SQL query. If the table name specified in the original query matches the reserved table name for requesting a call to a web service, the interceptor invokes a module that generates a request to be sent to the specified web service, and the web service may be unrelated to the database client that encoded the intercepted SQL query. In this case, the executable module composes a web service request and sends the request to the web service provider over a web-services protocol.

Upon receiving a response from the data source to the newly composed data request, the SQL interceptor forwards the response back to the database client. Responses received from a database server are decoded by the SQL interceptor, then recoded to send to the database client, but the format of the decoded response does not need to be changed. In contrast, data in a response received from a web service provider (i.e., web service response data) does not need to be decoded, but the response data in Extensible Markup Language (XML) or JavaScript Object Notation (JSON) format needs to be re-structured into an SQL query response and then sent to the database client in a binary-encoded format.

DETAILED DESCRIPTION OF THE INVENTION

The following description will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

Figure 1:
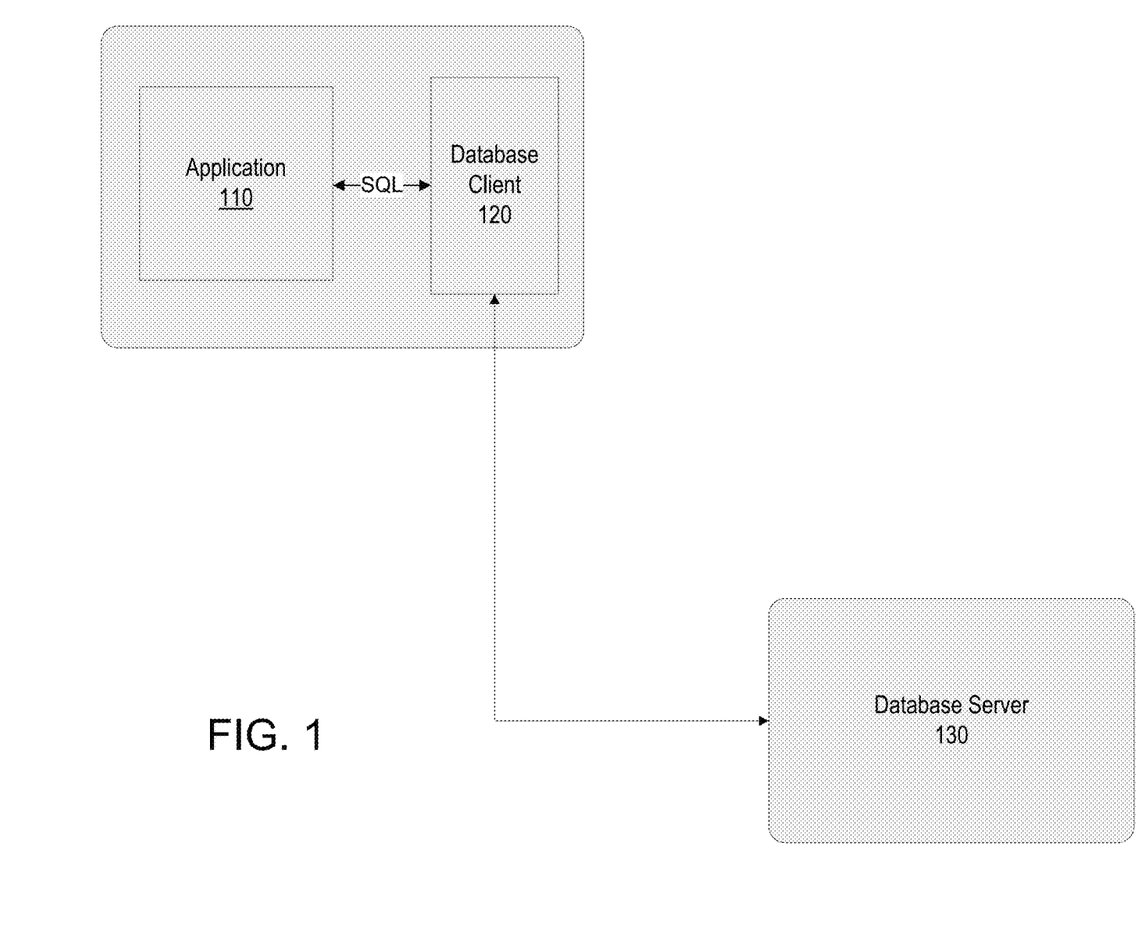
FIG. 1 is a block diagram illustrating an SQL request from application to database server.

FIG. 1 is a block diagram illustrating an SQL data collection request from an application 110 to a database server 130 by way of a database client 120. The SQL query constructed by the user using the application user interface is sent to the database client 120, and the database client forwards the SQL query to the database server 130 using a low level protocol that binary encodes the messages.

In an embodiment, a database client 120 is embedded in or linked into the application's process, and the SQL query is passed to the database client 120 by way of a function call. In another embodiment, the database client 120 is a separate process and the SQL query is sent to the database client 120 using inter-process communication. The database client 120 may be provided by the vendor of the database server 130, and the database client 120 and the database server 130 may communicate with each other by sending binary-encoded messages between them. The communication may take place using a protocol that is specific to the database vendor.

Some operating systems support the ability to specify the order to search for library entry points at run time. This allows introducing a library routing having the same API as the database client 120 that can intercept the application data request and re-write the SQL before it reaches the database client. A developer may specify that Tableau by dynamically linked to interceptor library routine which is linked to the database client. However, not every system provides this ability. In addition, intercepting the request before the database client limits kind of data sources that can be used to retrieve the data. Not only is such a library routine limited to generating SQL queries, but the queries may only be sent to the database server corresponding to the particular database client.

Figure 2:
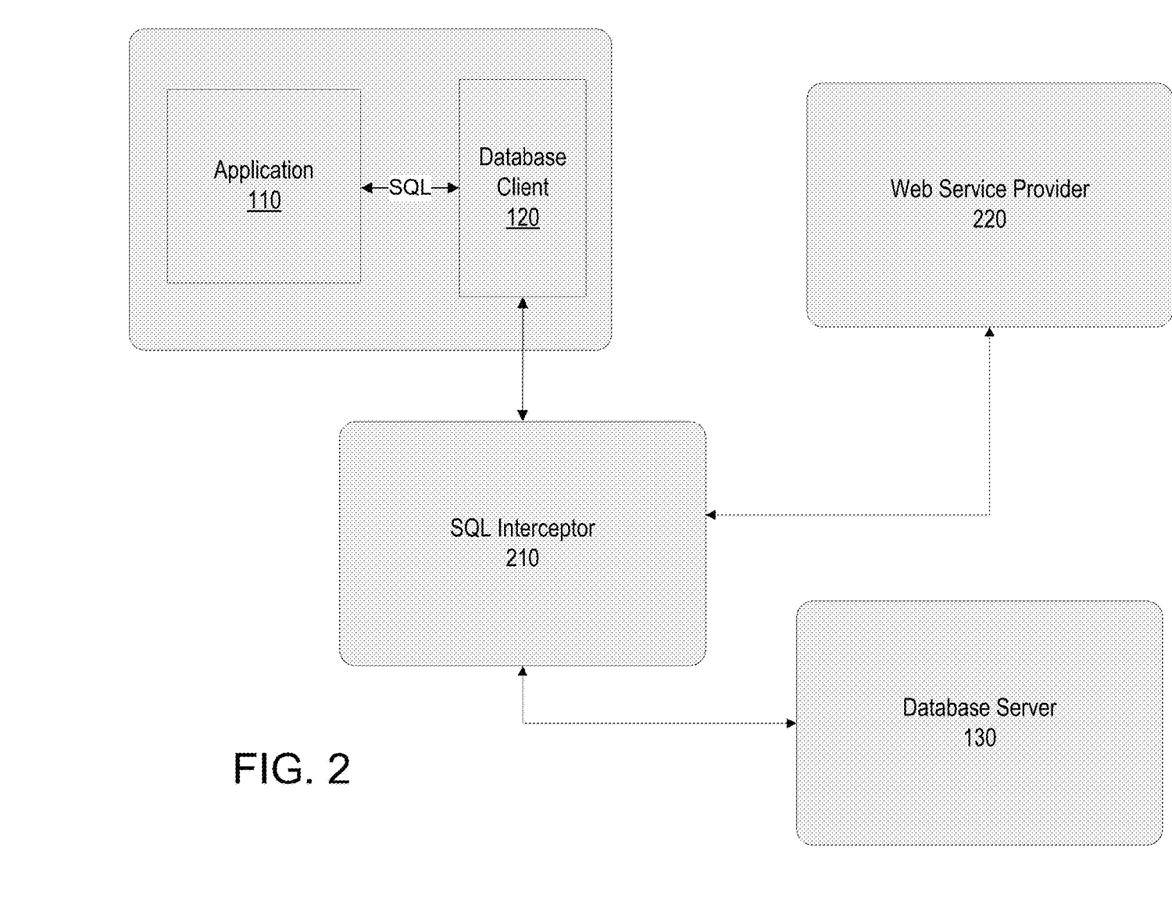
FIG. 2 is a block diagram illustrating the SQL interceptor intercepting an SQL request sent from a database client and sending new data requests to a database server or web service provider, according to an embodiment of the invention.

Instead of intercepting the application query before the database client receives the query, this disclosure describes intercepting the application query between the database client and the database server. FIG. 2 is a block diagram illustrating the SQL interceptor intercepting an SQL request sent from the database client 120 to the database server 130. The SQL Interceptor 210 listens on the same port on which the database server 130 receives binary-encoded messages. The SQL Interceptor decodes the binary-encoded message from the database client 120 to retrieve the SQL query sent from the application 110. The SQL Interceptor transforms the query into a new SQL query, binary encodes the new SQL query, and sends the binary-encoded message to the database server 130. Database server 130 processes the new SQL query and sends the query response data back to the SQL Interceptor 210. The SQL Interceptor 210 may process the response data then send the processed response data back to the database client 120. Otherwise, the SQL Interceptor 210 may simply forward the response data back to the database client 120. The database client 120 provides the SQL query response data to the application 110.

In an embodiment, the SQL interceptor may include multiple executable modules for composing the new SQL query from the application SQL query. An executable module is selected for execution based on data in the application-generated SQL query. In an embodiment, each executable module is a script, and the name of the script to run is identified or constructed based on a parameter value in the application SQL query.

In an embodiment, the application SQL query may request a data to be retrieved from a web service. The application's SQL query retrieved from the binary encoding of the database client 120, may trigger the SQL Interceptor 210 to invoke an executable module that creates a data request from a web service rather than from a database. When so triggered, the SQL Interceptor 210 constructs a new data request to send to web service provider 220 instead of creating a new SQL query. The response from the web service provider is sent back to the SQL Interceptor 210. Unlike the SQL response received from the database server that is decoded before sending back to the application, and the decoded data is already in the format of an SQL response expected by the database client 120, a response from a web service request may not require decoding but may require to be transformed into the expected format of an SQL query response. In an embodiment, the results from a web service request may be expressed in XML or JSON. Off the shelf utilities parse XML or JSON into a java object, and values from the java object are retrieved to construct a response in the format of an SQL query response.

Figure 3:
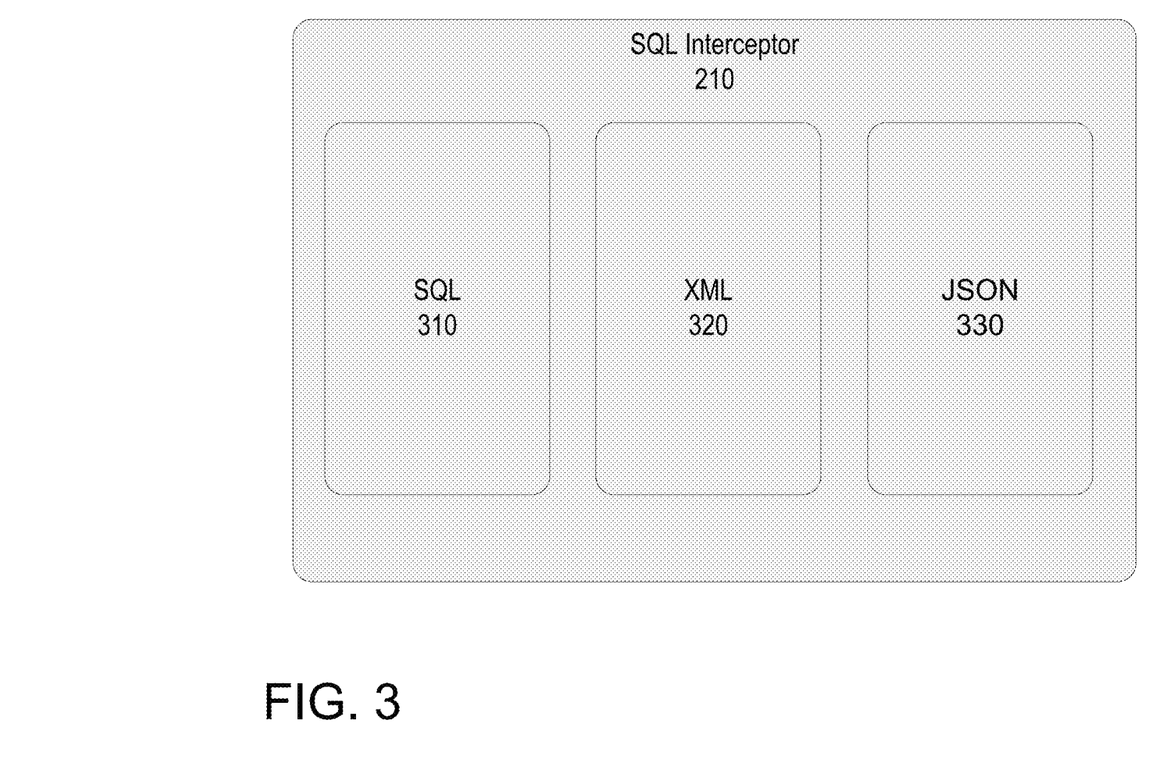
FIG. 3 is a block diagram illustrating modules within the SQL interceptor for constructing different kinds of queries, according to an embodiment of the invention.

FIG. 3 is a block diagram illustrating modules within the SQL interceptor for constructing different kinds of queries, according to an embodiment of the invention. The SQL Interceptor 210 can include several different modules, each for constructing a particular kind of query and processing the data received in response to sending the query. A module may be selected for execution by determining a module entry point, such as a function name, within the module. The entry point may be determined based on information in the application-generated SQL query. FIG. 3 illustrates three different kinds of modules: SQL 310 creates a new SQL query and sends the query to a database server; XML 320 creates an XML/Simple Object Access Protocol (SOAP) web service call, parses the response XML, and creates an SQL query response from the parsed XML; and JSON 330 creates a JSON/REST web service call, parses the JSON response, and creates an SQL query response from the parsed JSON. Each of these modules may be implemented as a script or programmed in a programming language. A script-based implementation may be general to process any query directed at any database or service provider. A programmed module may be coded specifically for a single interface, for example multiple XML or JSON modules may coexist, each handling a different web service interface to the same or different web service providers.

Figure 4:
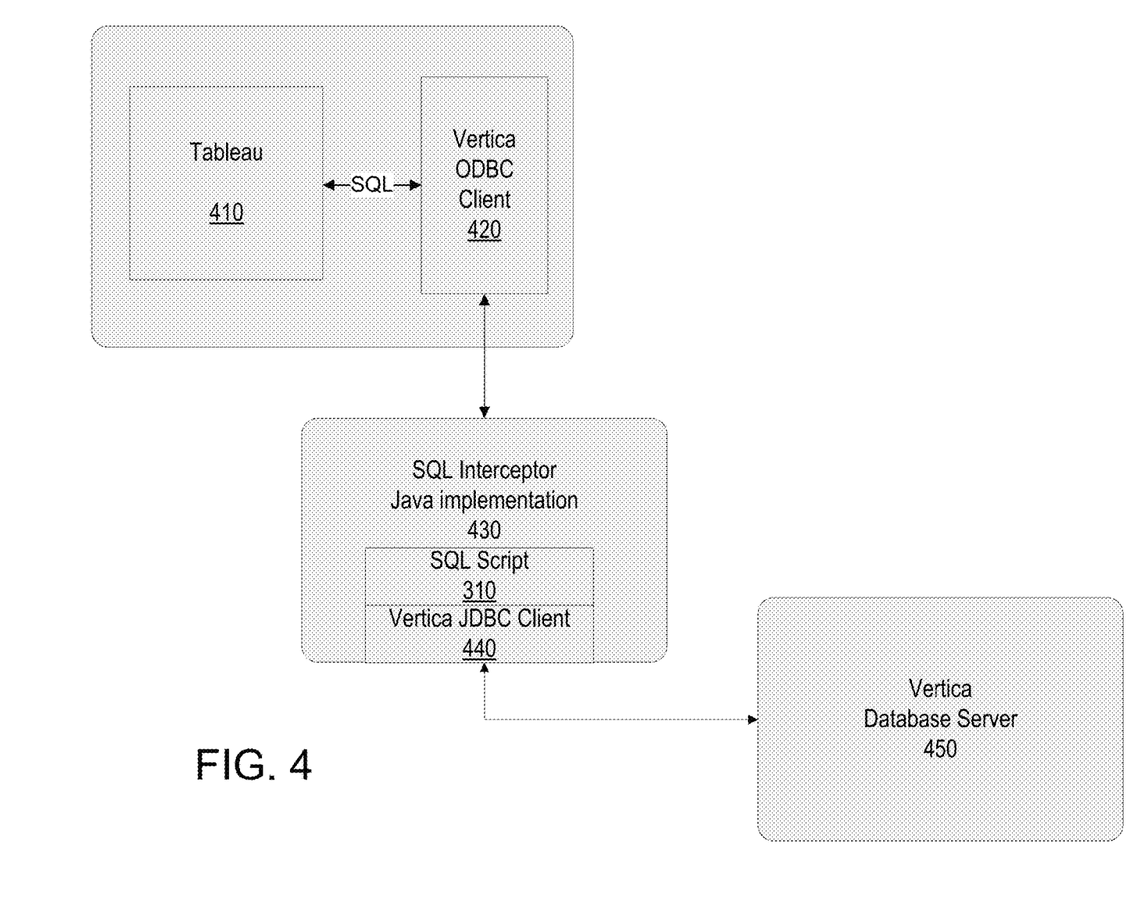
FIG. 4 is a block diagram showing an example implementation creating a rewritten SQL query.

FIG. 4 is a block diagram showing an example implementation for intercepting an SQL query using a script-based SQL module. A user may interact with a business intelligence application such as Tableau 410 to create an SQL query to retrieve data for visualization. The user-constructed Tableau query may be passed to a database client such as Vertica ODBC client 420. The off-the-shelf ODBC database client sends the query to the database server such as the Vertica database server 450 via a low level Vertica communication protocol. "Off-the-shelf" is intended to mean that limited or no changes or customizations can be made to affect the operation of the application or library.

The SQL interceptor 430 intercepts the binary-encoded message intended for the Vertica database server 450, decodes the message, and extracts the original Tableau SQL query. Information in the SQL query triggers the SQL interceptor to invoke SQL script 310 to create a new SQL database query using parameter values from the Tableau SQL query to create the new query.

The SQL interceptor 430 may be a program written in java. When the SQL interceptor sends the new SQL query to the Vertica database server 450, it may use a Vertica Java Database Connectivity (JDBC) client 440. The Vertica JDBC client 440 performs the binary encoding and communicates with the database server using a low level Vertica protocol.

The Vertica database server 450 executes the query and returns SQL response data back to the Vertica JDBC client 440 via the low level interface. The database client expects to receive the response to an SQL query structured as a table with rows and columns. The JDBC client 440 decodes the result data and constructs java objects representing the results data. The SQL Interceptor 430 converts the java objects to binary format and sends the binary-encoded results to the Vertica ODBC client 420. The Vertica ODBC client 420 decodes the binary-encoded results and constructs Tableau objects representing the results. Tableau renders the chart to display to the user a visual representation of the results from the user-created Tableau SQL query.

Figure 5:
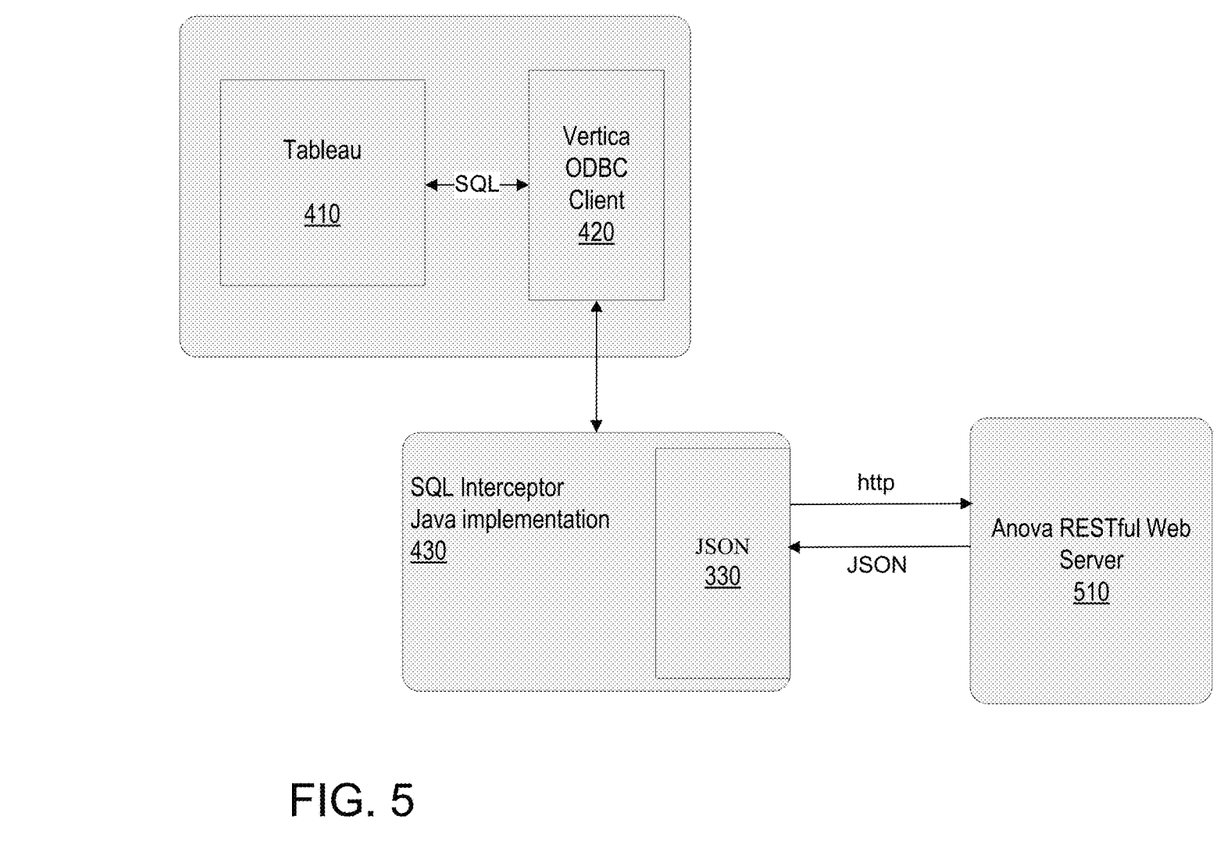
FIG. 5 is a block diagram showing an example implementation for creating a web service request.

FIG. 5 is a block diagram showing an example implementation for intercepting a RESTful web service request. In this example, JSON 330 is a module that is programmed in Java and sends an http request to a RESTful web service provided by a web service provider such as Anova Network Analytics 510. The response to the web service request is expressed in JSON. The JSON 330 module comprises a parser for parsing the JSON response, an unmarshaller for unmarshalling the parsed data into a java object, and a translator for translating the data in the response java object into the SQL query response. In an embodiment, the structure of the hierarchical data returned from a web service may be constrained so that the hierarchy can be automatically mapped to the table format of an SQL query response. In another embodiment, no constraints on the hierarchy are enforced, and the developer of the executable module, for example JSON 330 module, codes a custom mapping from the results hierarchy to the SQL results table.

Figure 6:
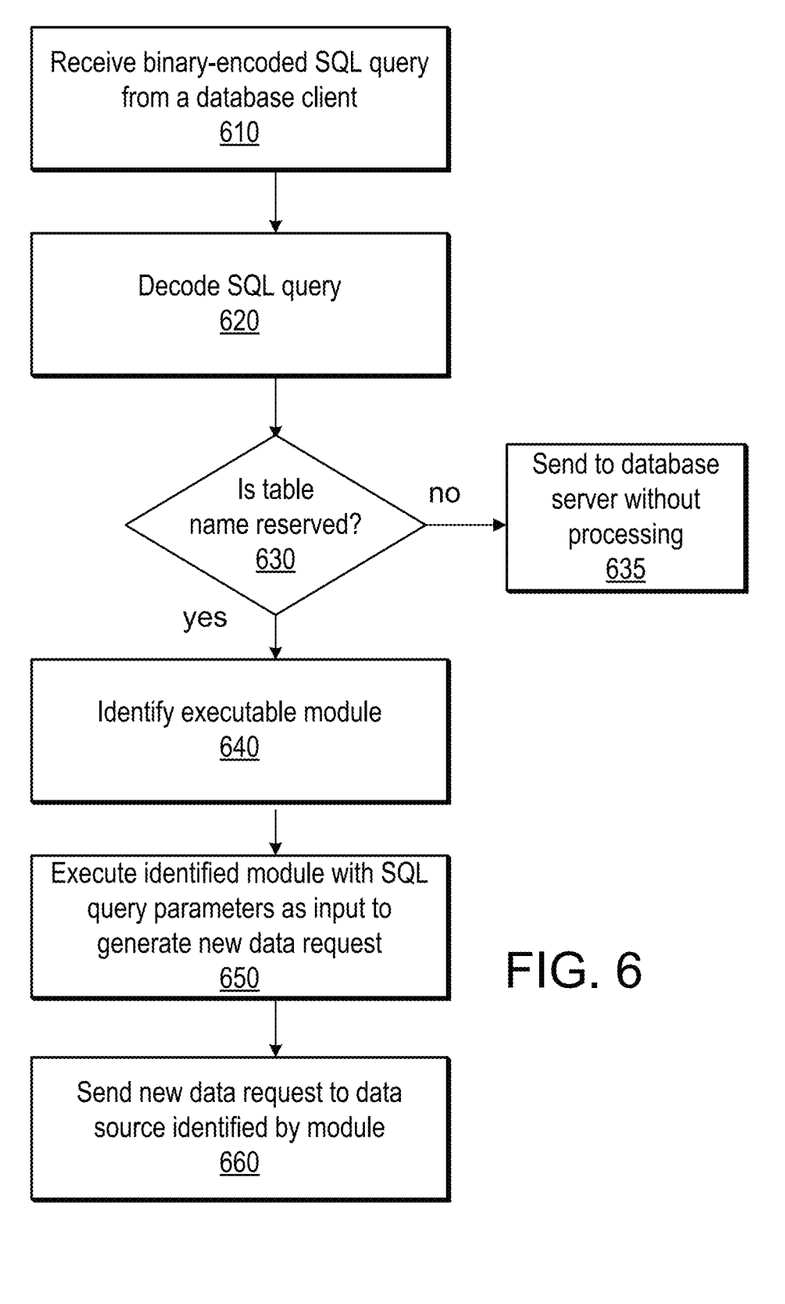
FIG. 6 is a flow chart showing a process for intercepting and processing a SQL query from an off-the-shelf application.

FIG. 6 is a flow chart showing a process for intercepting and processing a SQL query from an off-the-shelf application, according to an embodiment of the invention. In Step 610, a binary-encoded SQL query is received from a database client. In Step 620, the binary-encoded query is decoded to retrieve the original SQL query from the application. In Step 630, the table name in the original SQL query is compared against reserved names to determine if this query requires special processing or whether it should simply pass through to the server with no rewriting in Step 635. When the table name in the original SQL query matches a reserved table name, special processing is performed. There need not be a table in the target database having the reserved name. If the reserved table name indicates that a modified SQL query is desired, then in Step 640 an executable module is retrieved from one or more parameter values included in the original SQL query. In Step 650, the identified module is executed using the parameters defined in the original SQL query as input to the module. The module generates a new data request that identifies a data source, and the newly created data request is sent to the data source.

EXAMPLE

Figure 7:
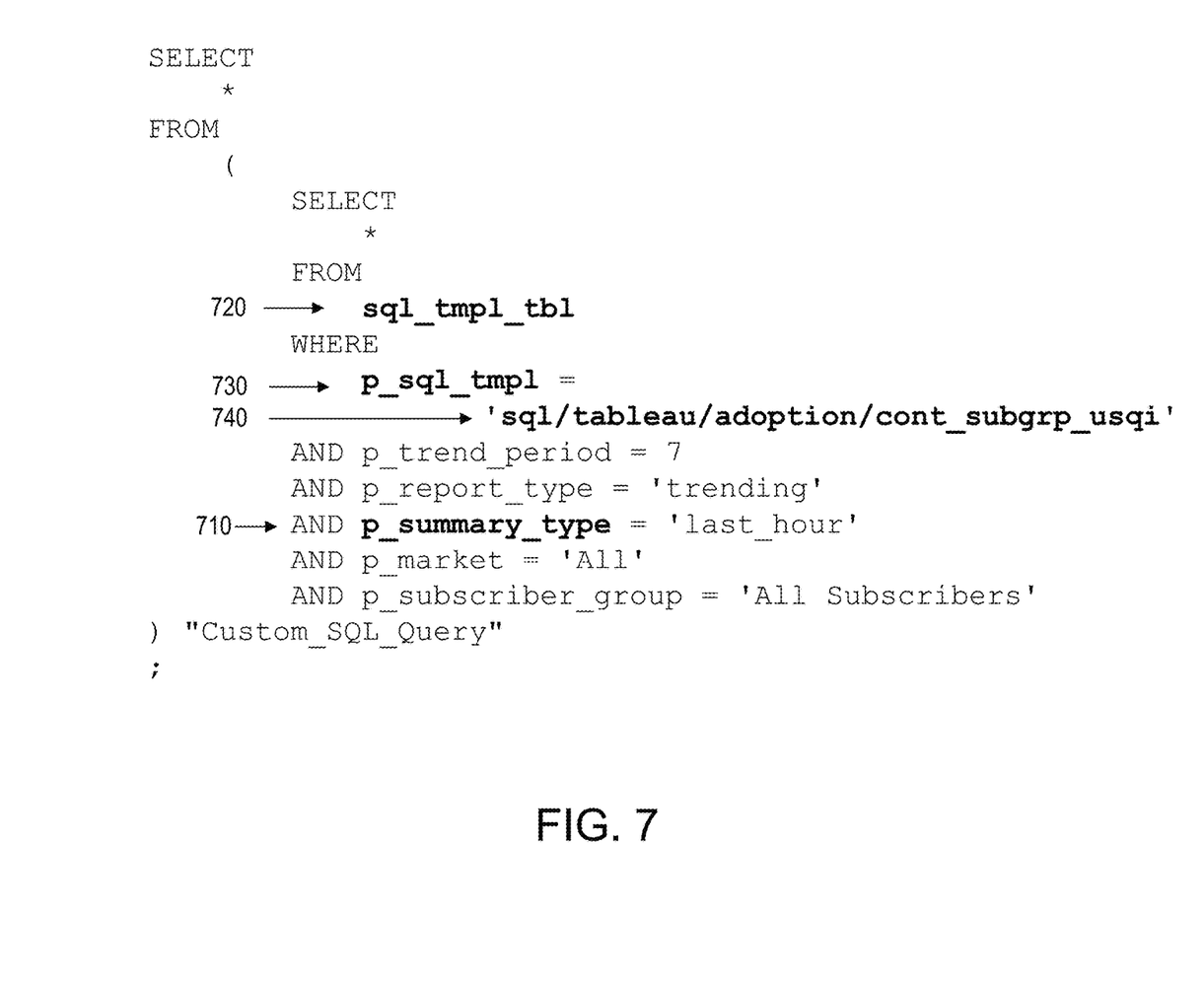
FIG. 7 is an example parameterized SQL statement received from an application that can be customized to request special processing by the SQL interceptor, according to an embodiment of the invention.

The first example produces a report showing the trend of the number of subscribers adversely impacted by quality issues over time. The time line is in hourly increments. The summary type of "last_hour" (710) indicates that the trend will start from the most recently collected hourly data on the current day, and the trend period indicates that the display will include data collected going backwards seven days from most recent collected data.

FIG. 7 is a boilerplate SQL query that can be customized in Tableau for special processing by the SQL Interceptor. Normally, SQL interprets sql_tmpl_tbl (720) that follows the FROM keyword as the name of a database table. However, in this example, the name sql_tmpl_tbl is a reserved table name that signals the SQL interpreter to process this request using the script indicated by the value in p_sql_tmp (730). In this example, there is no table in the database named sql_tmpl_tbl. The designated script rewrites the SQL query, supplying the actual table names in the database. In this example, the script name is sql/tableau/adoption/cont_sub-grp_usqi (740). The other variable names are used for constructing the rewritten SQL query. The list of parameters is specific to the script that will rewrite the query.

In an embodiment of the invention, the script that is executed to produce the new SQL query is an Apache Velocity script. Apache Velocity, from the Apache Software Foundation, is a Java-based template engine that provides a template language to reference objects defined in Java code.

This example SQL script may be used to generate an hourly or a daily report. The value of p_summary_type is used to direct the interceptor to retrieve data that was collected during a time interval that is relative to the last processed interval and also directs the granularity of the retrieved data as hourly or daily. In this particular case, the daily data is stored in a different table from the hourly data so the value of p_summary_type is used to determine from which table to retrieve the data. In this example, p_summary_type indicates hourly data.

Figure 8:
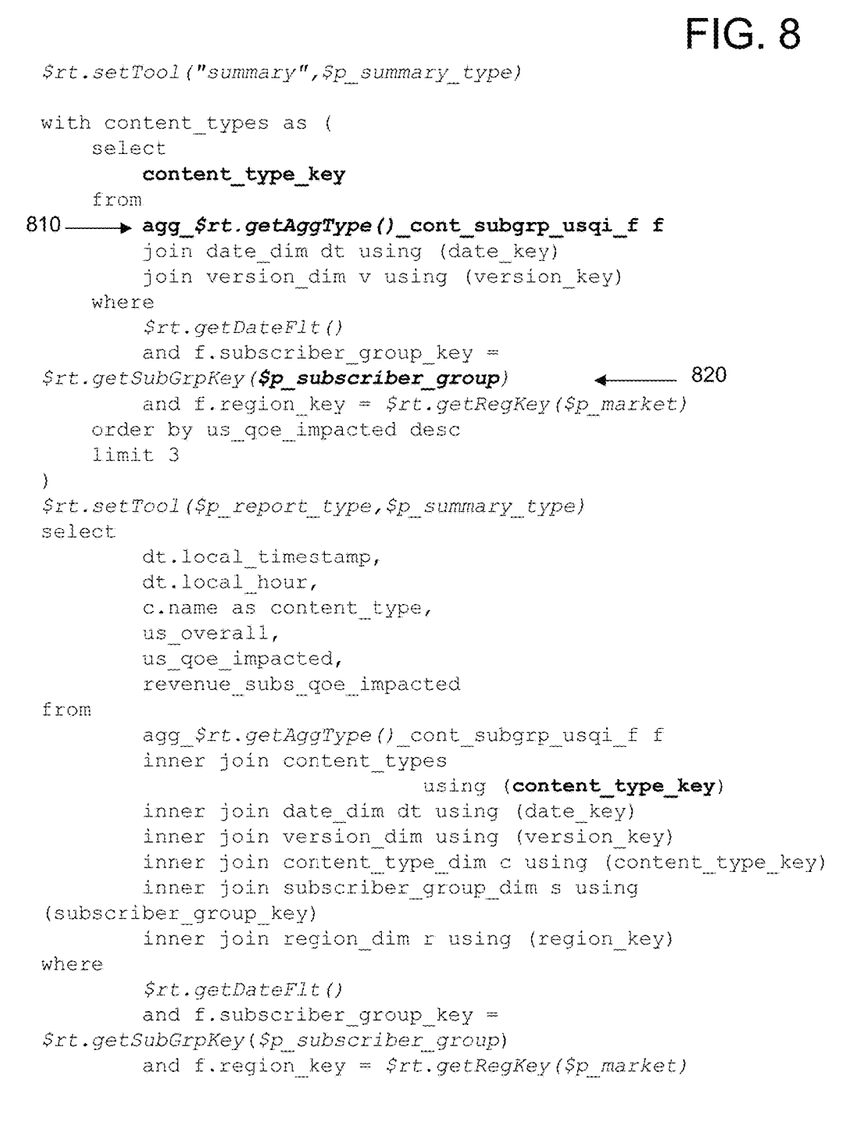
FIG. 8 is an example script used to generate a new SQL based on the example SQL query shown in FIG. 7.

FIG. 8 is an example script sql/tableau/adoption/cont_subgrp_usqi used to generate an SQL query using the input from the example SQL in FIG. 7. The script is a parameterized template. That is, much of the script appears literally in the re-written SQL interspersed with parameters (that start with "$" and are shown in italics) that are replaced with the parameter values. For example:

```
with content_types as (
    select
        content_type_key
    from
        <parameters>
    where
        <parameters>
```

A parameter may be a combination of literal text and a command, which when executed, returns text to replace the command in the literal string. For example, the database table name seen in the script as "agg_$rt.getAggType( )_cont_subgrp_usqi_f f" (810) is replaced with the concatenation of the literal text "agg_", the result of executing the command "$rt.getAggType( )", and the literal text "_cont_subgrp_usqi_f f". $rt is a data structure that contains the parameter names and values from the source SQL script, and a set of commands is defined to retrieve a value of a parameter. The value of a parameter in the original SQL script may appear literally in the rewritten script with a "$" prefix to indicate that the value of the parameter is to be used. For example, $p_subscriber_group (1120) is replaced with the value "All Subscribers" that was assigned in the script shown in FIG. 7.

Figure 9:
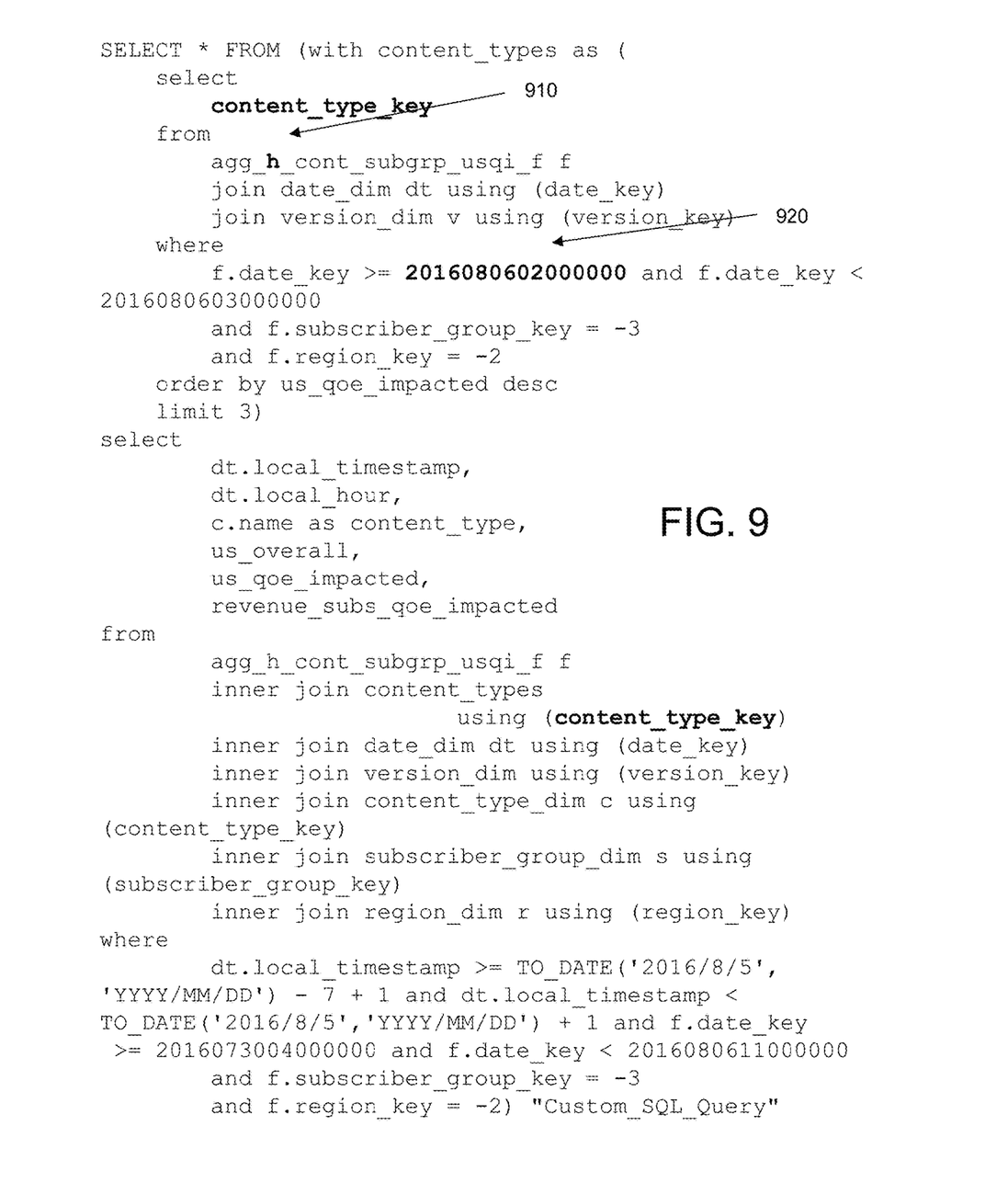
FIG. 9 is an example of a SQL query that is generated by the script shown in FIG. 8 using as input the example Tableau SQL query shown in FIG. 7.

FIG. 9 is an example of an SQL query that is generated by the script shown in FIG. 8 using as input the example Tableau SQL query shown in FIG. 7. As can be seen in FIG. 9, $rt.getAggType( ) is replaced with "h" (910) to indicate hourly, and $rt.getDateFlt( ) is replaced with the current date, which in this example is 8/6/2016 (920).

Figure 10:
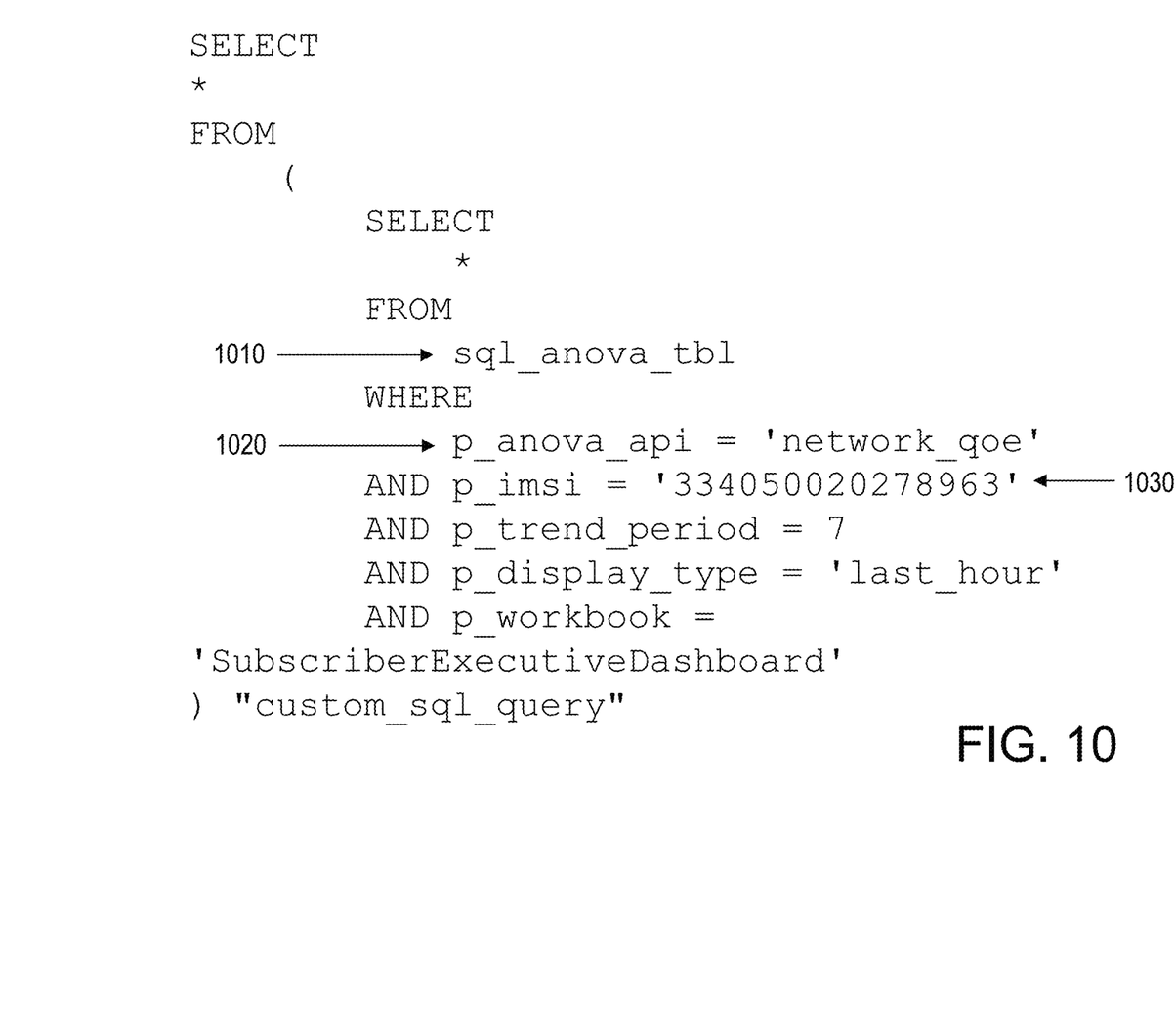
FIG. 10 is another example of a parameterized SQL statement received from an application that is customized to request data from a web service provider.
Figure 11A:
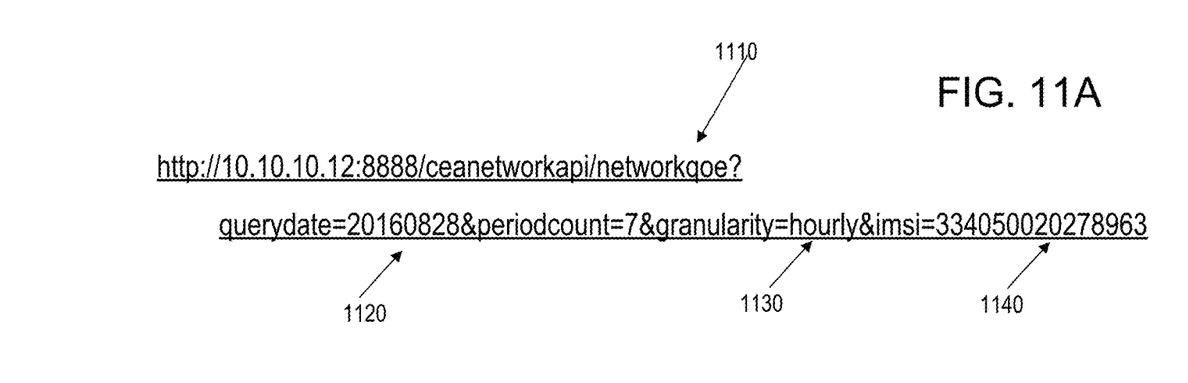
FIG. 11A is an example Representational State Transfer (REST) web service call created using as input the example Tableau SQL query of FIG. 7, according to an embodiment of the invention.

FIG. 10 is another example of a parameterized SQL statement received from an application that is customized to request data from a web service provider. In this example, data is requested to provide an overview of a particular subscriber's experience with the data service on the phone. The retrieved data includes the network quality of experience over seven days including the last hourly data collection, similar to the request shown in the previous example. Table name sql_anova_tbl (1010) triggers the interceptor to create a RESTful web service request. The p_anova_api (1020) indicates the desired web service interface. The SQL parameters are used to create an http request as illustrated in FIG. 11A. The p_imsi parameter (1030) identifies the subscriber.

FIG. 11A is an example REST web service call created by JSON module 330 from the example Tableau SQL query of FIG. 10. The request is directed to a networkqoe (1110) function that returns the quality of experience for a user. The query parameters include the date of the current day which is the last day for which data is requested (August 28, 2016) (1120), the period count indicates that data for the preceding seven days will be included in the trend, and the granularity (hourly 1130) which indicates that the data is to be taken from a table of data collected hourly, and the imsi (1140) is the identifier of the subscriber whose experience is being retrieved.

Figure 11B:
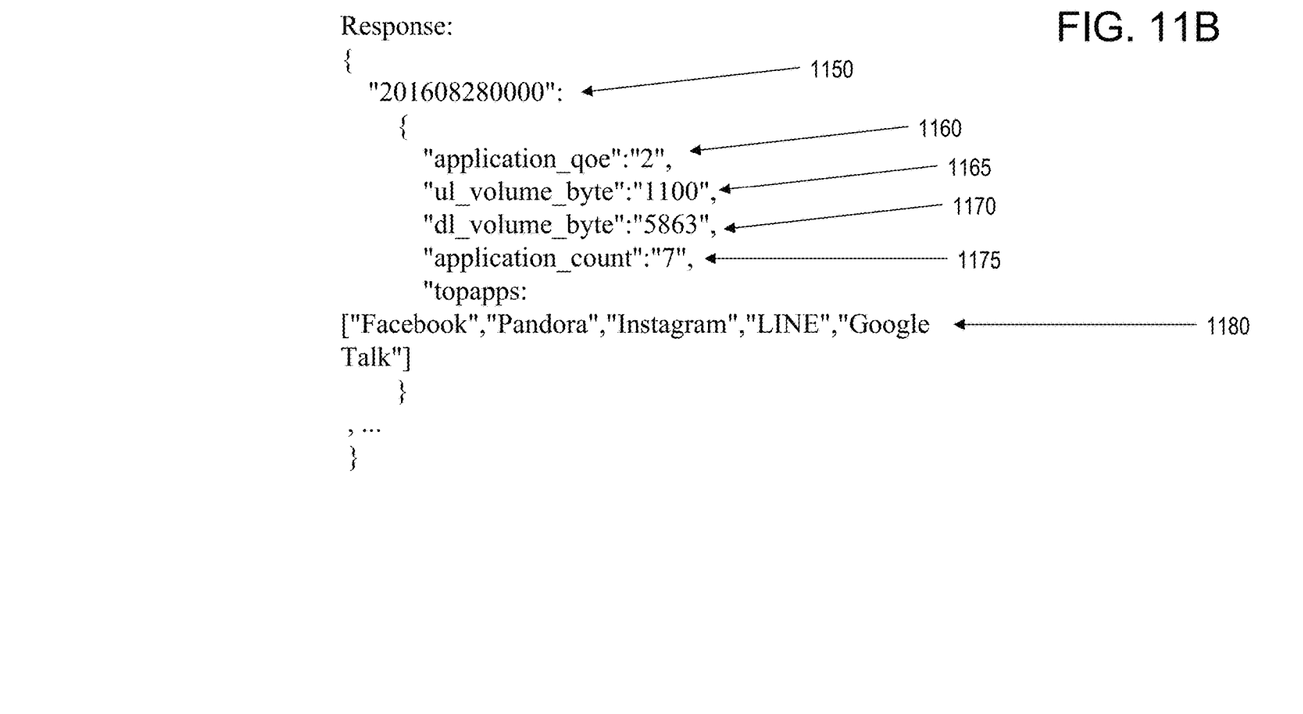
FIG. 11B is an example response returned from the REST web service call of FIG. 11A, according to an embodiment of the invention.

FIG. 11B is an example response returned from the REST web service call of FIG. 11A. The response is expressed in JSON format. There will be one entry in the JSON response for each data point representing an hour of the data, and "201608280000" is a timestamp (1150) indicating with which hour the entry corresponds. "application_qoe":"2" (1160) indicates the experience score for the data service on a scale of 1 to 5 with 1 indicating poor experience and 5 indicating good experience. "ul_volume_byte":"1100" (1165) indicates the number of bytes uploaded and "dl_volume_byte":"5863" (1170) indicates the number of bytes downloaded. "application_count":"7" (1175) is the number of applications used by the subscriber during this hour, and "topapps: ["Facebook","Pandora","Instagram","LINE", "Google Talk"] (1180) indicates the five applications most used during that hour.

COMPUTER SYSTEM

Figure 12:
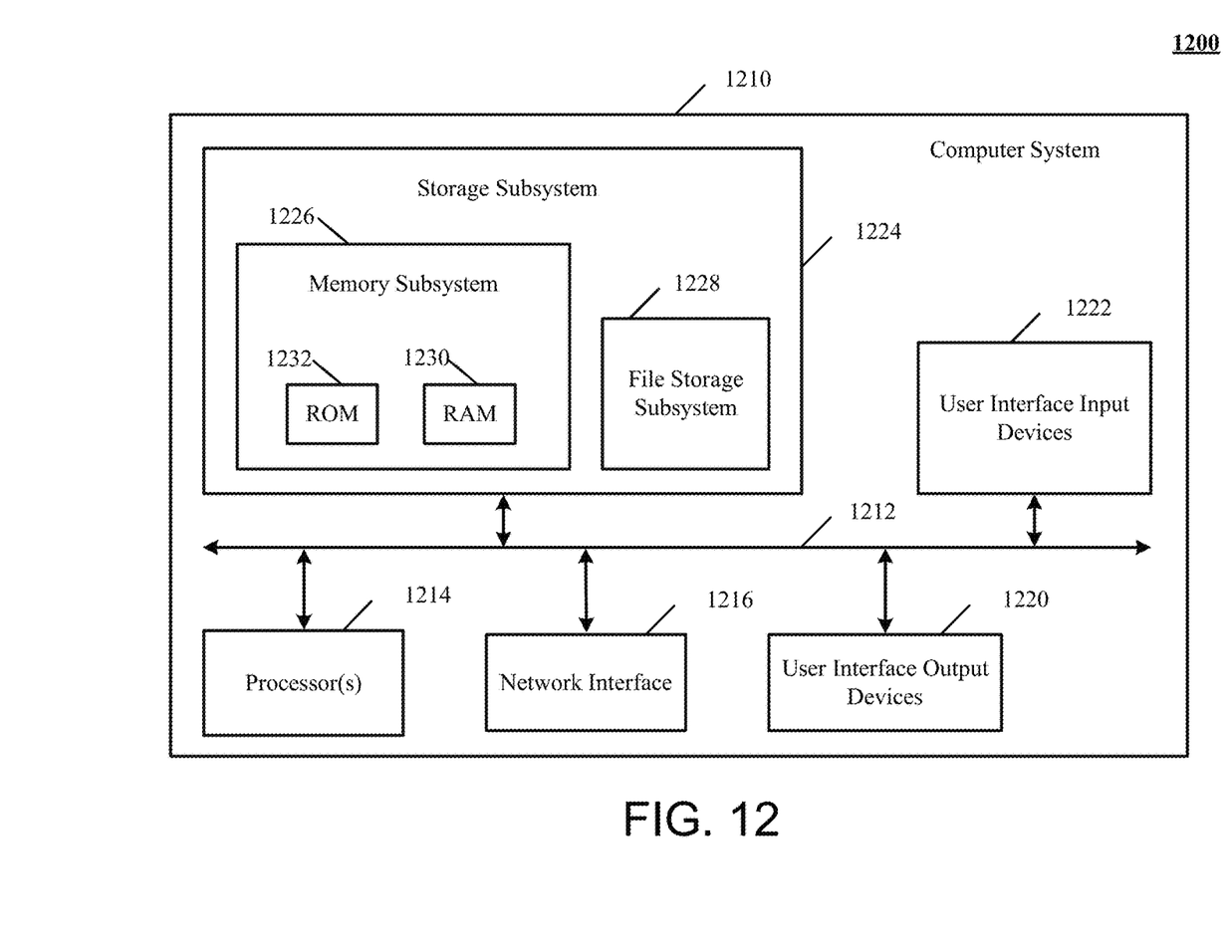
FIG. 12 is a block diagram of an example computer system.

FIG. 12 is a block diagram of an example computer system, according to one implementation. Computer system 1210 typically includes at least one processor 1214 that communicates with a number of peripheral devices via bus subsystem 1212. These peripheral devices may include a storage subsystem 1224 including, for example, memory devices and a file storage subsystem, user interface input devices 1222, user interface output devices 1220, and a network interface subsystem 1216. The input and output devices allow user interaction with computer system 1210. Network interface subsystem 1216 provides an interface to outside networks, including an interface to corresponding interface devices in other computer systems.

User interface input devices 1222 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1210.

User interface output devices 1220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 1210 to the user or to another machine or computer system.

Storage subsystem 1224 stores programming and data constructs that provide the functionality of some or all of the modules and methods described herein. These software modules are generally executed by processor 1214 alone or in combination with other processors.

Memory 1226 used in the storage subsystem can include a number of memories including a main random access memory (RAM) 1230 for storage of instructions and data during program execution and a read only memory (ROM) 1232 in which fixed instructions are stored. A file storage subsystem 1228 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1228 in the storage subsystem 1224, or in other machines accessible by the processor.

Bus subsystem 1212 provides a mechanism for letting the various components and subsystems of computer system 1210 communicate with each other as intended. Although bus subsystem 1212 is shown schematically as a single bus, alternative implementations of the bus subsystem may use multiple busses.

Computer system 1210 can be of varying types including a workstation, server, computing cluster, blade server, server farm, or any other data processing system or computing device. Due to the ever-changing nature of computers and networks, the description of computer system 1210 depicted in FIG. 12 is intended only as one example. Many other configurations of computer system 1210 are possible having more or fewer components than the computer system depicted in FIG. 12.

Some Particular Implementations

In one implementation, a method for enhancing data collection by a data analytics application is described from the perspective of a proxy placed between the data analytics application and a database server. The method includes receiving a data request from a database client used by the data analytics application, the data request comprising a binary-encoded SQL query that is generated by the data analytics application. The method also includes decoding the binary-encoded application-generated SQL query and identifying, based on a database table name in the decoded application-generated SQL query, whether the application-generated SQL query is a request to forward the application-generated SQL query without modification to the database server or to generate a new SQL query to request data from the database server. Responsive to detecting that the database table name in the decoded application-generated SQL query indicates a request for a new SQL database query, generating the requested new SQL query, using a first executable module selected for execution among a plurality of executable modules based on a first parameter value in the decoded application-generated SQL query; determining, the database table based on a second parameter value in the decoded application-generated SQL query; and binary encoding the new SQL query in a format accepted by the database server. The method further includes sending the binary-encoded new SQL query to the database server, receiving SQL response data from the database server in a format accepted by the embedded or linked database client; and sending from the proxy to the embedded or linked database client the SQL response data in a binary encoded format accepted by the embedded database client.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

In an embodiment, the data analytics application is Tableau. The database table name in the application-generated SQL query identifies whether the query should cause generation of a database query or a web service call. The database table name in the application-generated SQL query may be matched against a reserved name. If the database table name does not match a reserved name, then the request may be forwarded to the database server without further processing. If a database table name matches a reserved name, then further processing may be performed by an executable module associated with the matched reserved name.

The query is then rewritten as a new SQL query and sent to a database server or as a web service interface invocation and sent to a web service provider. Different executable modules within the proxy may be selected to transform the query and send the transformed data request to the corresponding data source. An executable module may be a script or a function programmed into the proxy or accessible to the proxy via a code library. The name of script to execute may be determined based on the value of an SQL parameter in the application-generated SQL query. The script may be a Velocity script.

A web service request may invoke a REST or XML-based web service. When invoking a REST web service, the SQL query is re-written as a JSON/REST web service request, and the response is transformed from JSON into SQL response format. When invoking an XML/SOAP web service, the SQL Query is rewritten as an XML/SOAP web service request and the response is transformed from XML into SQL response format.

Yet other implementations include a non-transitory computer-readable storage medium storing instructions that when executed perform the method for enhancing data collection by a data analytics application described above as well as a system including the data analytics application with an embedded database client, or linked to the database client, a proxy that performs the method for enhancing data collection by a data analytics application, a database server, and a web service provider.

I claim as follows:

1. A method for enhancing data collection by a data analytics application comprising:
    at a proxy between the data analytics application and a database server, receiving from a database client embedded in or linked to the data analytics application a data request comprising a binary-encoded application-generated SQL query;
    decoding the binary-encoded application-generated SQL query;
    identifying, by matching a database table name in the decoded application-generated SQL query to a list of reserved table names, whether the application-generated SQL query is a request to:
        trigger generating a new SQL query to request data from the database server; or
        forward the application-generated SQL query without modification to the database server;
    responsive to detecting that the database table name matching an entry in the list of reserved table names indicates a request for a new SQL database query:
        generating the requested new SQL query, using a first executable module selected for execution among a plurality of executable modules based on a first parameter value in the decoded application-generated SQL query;
        determining, by the first executable module, the database table determined based on a second parameter value in the decoded application-generated SQL query;
        binary encoding, at the proxy, the new SQL query in a format accepted by the database server, and sending the binary-encoded new SQL query to the database server; and receiving, at the proxy, SQL response data from the database server in a format accepted by the embedded or linked database client; and sending from the proxy to the embedded or linked database client the SQL response data in a binary encoded format accepted by the embedded database client.

2. The method of claim 1, further comprising, while processing a second query:

wherein the identifying further includes, identifying from the matching of the database table name to the list of reserved table names that the application-generated SQL query is a request to generate a web service call to a web service provider;

responsive to detecting that the database table name matching an entry in the list of reserved table names in the decoded application-generated SQL query indicates a request to generate a web service call to a web service provider:

executing a second module to generate the web service call, the second executable module selected for execution based on a third parameter value in the decoded application-generated SQL query;

determining, by the executing module, a web service interface that is provided by the web service provider, the web service interface determined based on a fourth parameter value in the decoded application-generated SQL query;

sending, by the proxy, the web service call to the web service provider;

receiving, by the proxy, web service response data from the web service provider; and re-structuring the web service response data as SQL response data.

3. The method of claim 2, wherein the second executable module is a function programmed into the proxy.

4. The method of claim 2, further comprising:

identifying, from the matching of the database table name to the list of reserved table names that the application-generated SQL query is a request to generate a JSON/REST web service call;

composing the web service request as a JSON/REST web service request, wherein the web service is a RESTful web service;

receiving JSON response data from the RESTful web service; and transforming the JSON response data into SQL response data.

5. The method of claim 2, further comprising:

identifying, from the matching of the database table name to the list of reserved table names that the application-generated SQL query is a request to generate a XML/SOAP web service call;

composing the web service request as an XML/SOAP web service request;

receiving XML response data from the XML/SOAP web service; and transforming the XML response data into SQL response data.

6. The method of claim 1, wherein the first executable module is a script, and the name of the script is the value of the second parameter value in the decoded application-generated SQL query.

7. A non-transitory computer-readable storage medium storing instructions for enhancing data collection by a data analytics application, the instructions which when executed by a processor, causes the processor to:

receive from a database client embedded in or linked to the data analytics application a data request comprising a binary-encoded application-generated SQL query;

decode the binary-encoded application-generated SQL query;

identify, by matching a database table name in the decoded application-generated SQL query to a list of reserved table names, whether the application-generated SQL query is a request to:

trigger generating a new SQL query to request data from the database server; or forward the application-generated SQL query without modification to a database server;

responsive to detecting that the database table name matching an entry in the list of reserved table names indicates a request for a new SQL database query:

generate the requested new SQL query, using a first executable module selected for execution among a plurality of executable modules based on a first parameter value in the decoded application-generated SQL query;

determine, by the executing module, the database table determined based on a second parameter value in the decoded application-generated SQL query;

binary encode the new SQL query in a format accepted by the database server, and sending the binary-encoded new SQL query to the database server; and receive SQL response data from the database server in a format accepted by the embedded or linked database client; and send to the embedded or linked database client the SQL response data in a format accepted by the embedded database client.

8. The non-transitory computer-readable storage medium of claim 7, further including instructions that cause the processor, by matching the database table name to the list of reserved names, to identify that the application-generated SQL query is a request to generate a web service call to a web service provider; and further comprising:

responsive to detecting that the database table name matching an entry in the list of reserved table names indicates a request to generate a web service call to a web service provider:

execute a second module to generate the web service call, the second executable module selected for execution based on a third parameter value in the decoded application-generated SQL query;

determine, by the executing module, a web service interface that is provided by the web service provider, the web service interface determined based on a fourth parameter value in the decoded application-generated SQL query;

send the web service call to the web service provider;

receive web service response data from the web service provider; and re-structure the web service response data as SQL response data.

9. A system for enhancing data collection by a data analytics application comprising:

a processor running the data analytics application that is linked to or has embedded within the application a database client for sending queries to a database server;

a processor running a proxy that is linked to or has embedded within the application a database client for sending queries to the database server;

a database server operable to respond to SQL queries;

the data analytics application operable to provide a user interface that allows a user to specify a constrained SQL query and invoke the embedded or linked database client to send the SQL query to the database server;

the embedded or linked database client operable to binary-encode the constrained SQL query and send the binary-encoded query to the database server;

the proxy operable to:
  intercept the binary-encoded query that was sent to the database server, the proxy operable to decode the query and extract the constrained SQL query;
  determine, by matching a database table name specified in the constrained SQL query to a list of reserved table names, to create a new SQL query instead of forwarding the constrained SQL query;
  generate the new SQL query using a first executable module selected for execution among a plurality of executable modules based on a first parameter value in the decoded application-generated SQL query;
  determine, by the executing module, the database table determined based on a second parameter value in the constrained SQL query; and
  binary encoding, at the proxy, the new SQL query in a format accepted by the database server, and sending the binary-encoded new SQL query to the database server;

the database server operable to receive the binary-encoded new SQL query, process the query, and send SQL response data in a format accepted by the embedded or linked database client;

the proxy further operable to:
  intercept the SQL response data from the database server, the SQL response data in a format accepted by the embedded or linked database client; and
  send to the embedded or linked database client the SQL response data in format accepted by the embedded database client;

the database client embedded into or linked by the data analytics application operable to receive the SQL response data from the proxy and providing the data to the application; and the application operable to create a visual representation of the SQL response data.

10. The system of claim 9, further comprising:

a channel for communication with a web service provider;

wherein the proxy is further operable to:
  identify, based on the database table name in the decoded application-generated SQL query, identify that the application-generated SQL query is a request to generate a web service call to the web service provider;
  execute a second module to generate the web service call, the second executable module selected for execution based on a third parameter value in the decoded application-generated SQL query;
  determine, by the executing module, a web service interface that is provided by the web service provider, the web service interface determined based on a fourth parameter value in the decoded application-generated SQL query;
  send the web service call to the web service provider;
  receive web service response data from the web service provider; and
  re-structure the web service response data as SQL response data.

* * * * *